US012625346B2

(12) United States Patent
Shih et al.

(10) Patent No.: US 12,625,346 B2
(45) Date of Patent: May 12, 2026

(54) PROJECTION APPARATUS AND AUTO-FOCUS METHOD

(71) Applicant: BENQ CORPORATION, Taipei City (TW)

(72) Inventors: Chia-Nan Shih, Taipei City (TW); Ming-Sheng Tai, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 356 days.

(21) Appl. No.: 18/461,529

(22) Filed: Sep. 6, 2023

(65) Prior Publication Data

US 2024/0385413 A1 Nov. 21, 2024

(30) Foreign Application Priority Data

May 19, 2023 (TW) ................................ 112118783

(51) Int. Cl.
G03B 21/53 (2006.01)
G02B 7/40 (2021.01)
G03B 21/14 (2006.01)

(52) U.S. Cl.
CPC ............. *G02B 7/40* (2013.01); *G03B 21/142* (2013.01)

(58) Field of Classification Search
CPC . G02B 7/40; G02B 7/28; G02B 7/282; G03B 21/142; G03B 21/53
See application file for complete search history.

(56) References Cited

U.S. PATENT DOCUMENTS

| | | | |
|---|---|---|---|
| 8,721,093 B2 | 5/2014 | Hsiung | |
| 2004/0130685 A1* | 7/2004 | Wu | G03B 21/53 353/101 |
| 2024/0267498 A1* | 8/2024 | Liao | H04N 9/317 |

FOREIGN PATENT DOCUMENTS

| | | |
|---|---|---|
| CN | 109426060 | 3/2019 |
| CN | 114885137 | 8/2022 |

(Continued)

OTHER PUBLICATIONS

"Office Action of Taiwan Counterpart Application", issued on Jan. 18, 2024, p. 1-p. 5.

*Primary Examiner* — Ryan D Howard
(74) *Attorney, Agent, or Firm* — JCIPRNET

(57) ABSTRACT

A projection apparatus including a projection module, a projection lens, an actuator, a distance sensor and a controller is provided. The projection module is adapted to project an image beam onto a projection surface to generate a projection image. The projection lens is disposed on a transmission path of the image beam. The actuator is connected to the projection lens and configured to adjust a focal length of the projection lens. The distance sensor is configured to sense a projection distance between the projection apparatus and the projection surface. The controller is electrically connected to the projection module, the actuator and the distance sensor, and is configured to adjust the focal length of the projection lens according to a look-up table and the projection distance sensed by the distance sensor, so as to perform automatic focusing. The lookup table includes a plurality of focal-length segments. The focal length falls within one of the focal-length segments. After confirming an end of a focus adjustment phase, the controller updates a minimum value and a maximum value of the one of the focal-length segments. An auto-focus method is also provided.

18 Claims, 5 Drawing Sheets

(56)     References Cited

FOREIGN PATENT DOCUMENTS

| TW | I451756 | 9/2014 |
| TW | I703400 | 9/2020 |

* cited by examiner

10

PS

IB

PD

200

400

100

300

500

AC

10'

PS

IB

PD

200

400

100

300

600

DS

500

AC

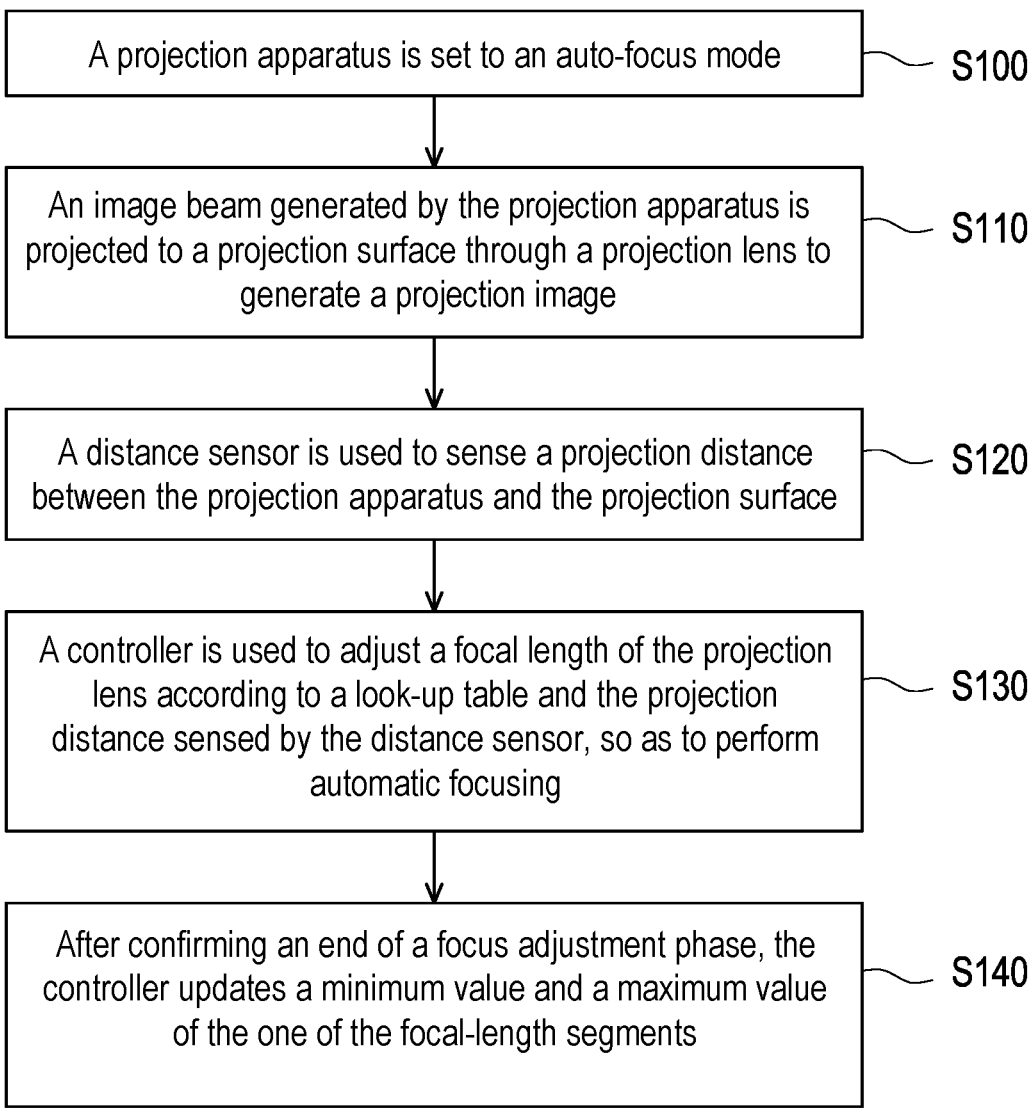

A projection apparatus is set to an auto-focus mode — S100

An image beam generated by the projection apparatus is projected to a projection surface through a projection lens to generate a projection image — S110

A distance sensor is used to sense a projection distance between the projection apparatus and the projection surface — S120

A controller is used to adjust a focal length of the projection lens according to a look-up table and the projection distance sensed by the distance sensor, so as to perform automatic focusing — S130

After confirming an end of a focus adjustment phase, the controller updates a minimum value and a maximum value of the one of the focal-length segments — S140

FIG. 3

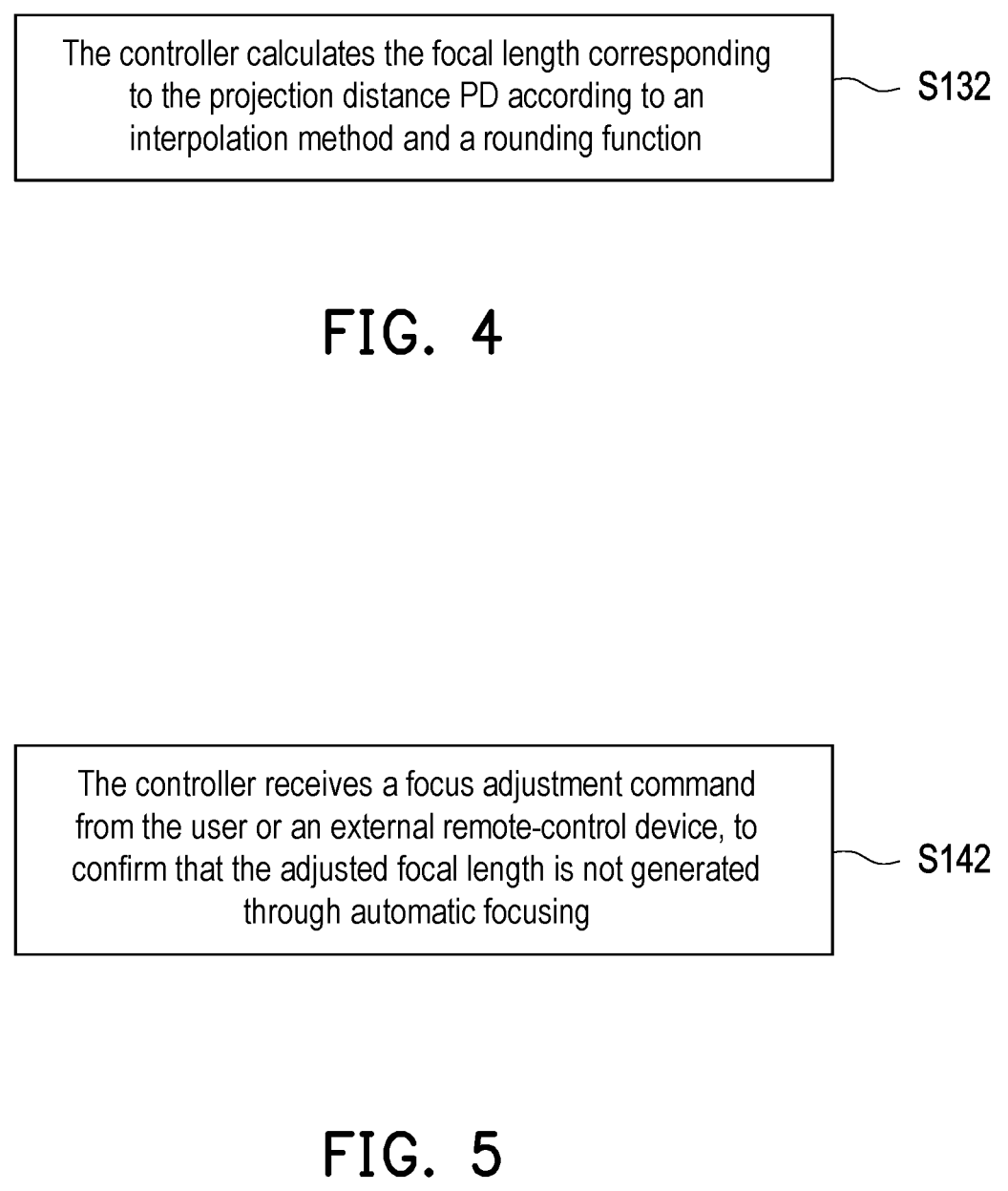

The controller calculates the focal length corresponding to the projection distance PD according to an interpolation method and a rounding function — S132

FIG. 4

The controller receives a focus adjustment command from the user or an external remote-control device, to confirm that the adjusted focal length is not generated through automatic focusing — S142

FIG. 5

PROJECTION APPARATUS AND AUTO-FOCUS METHOD

CROSS-REFERENCE TO RELATED APPLICATION

This application claims the priority benefit of Taiwan application serial no. 112118783, filed on May 19, 2023. The entirety of the above-mentioned patent application is hereby incorporated by reference herein and made a part of this specification.

BACKGROUND

Technical Field

The invention relates to an optical apparatus and an auto-focus method, and in particular, to a projection apparatus and an auto-focus method suitable for the projection apparatus.

Description of Related Art

Taking advantage of the small size and low cost of Time of Flight (ToF) to do autofocus is the trend of projection apparatus in recent years. Although ToF has the advantages of low cost and high value, there is still a problem that the projected image is out of focus due to machine error when using ToF in the automatic focusing of the projection apparatus. Among them, the above-mentioned machine error is the error that the machine itself cannot be compensated by a look-up table correction before leaving the factory. For example, the optical distortion during the production of the projection lens.

Although the industry provides a manual focus mechanism for when the image is out of focus after auto focus, the need to manually fine-tune the focus after each auto-focus will still cause poor user experience.

SUMMARY

The present invention provides a projection apparatus and an auto-focus method suitable for the projection apparatus, which can effectively solve the problem of out-of-focus of the projected image caused by the traditional auto-focus due to machine error.

An embodiment of the present invention provides a projection apparatus including a projection module, a projection lens, an actuator, a distance sensor, and a controller. The projection module is adapted to project an image beam onto a projection surface to generate a projection image. For example, the projection surface may be a projection screen or a bare wall. The projection lens is disposed on a transmission path of the image beam. The actuator is connected to the projection lens and configured to adjust a focal length of the projection lens. The actuator may be, for example, a stepper motor. The distance sensor is configured to sense a projection distance between the projection apparatus and the projection surface. The controller is electrically connected to the projection module, the actuator and the distance sensor, and is configured to adjust the focal length of the projection lens according to a look-up table and the projection distance sensed by the distance sensor, so as to perform automatic focusing. The lookup table includes a plurality of focal-length segments. The focal length falls within one of the focal-length segments. After confirming an end of a focus adjustment phase, the controller updates a minimum and a maximum value of the one of the focal-length segments.

An embodiment of the present invention provides an auto-focus method, which includes the following steps. A projection apparatus is set to an auto-focus mode. An image beam generated by the projection apparatus is projected to a projection surface through a projection lens to generate a projection image. A distance sensor is used to sense a projection distance between the projection apparatus and the projection surface. A controller is used to adjust a focal length of the projection lens according to a look-up table and the projection distance sensed by the distance sensor, so as to perform automatic focusing. The look-up table includes a plurality of focal-length segments, and the focal length falls within one of the focal-length segments. After confirming an end of a focus adjustment phase, the controller updates a minimum value and a maximum value of the one of the focal-length segments.

Based on above, in an embodiment of the present invention, the controller is used to update the minimum value and the maximum value of the focal-length segments after the projection apparatus and the auto-focus method confirm the end of the focus adjustment phase. That is to say, the lookup table is dynamically modified through the result of the focus adjustment phase, and then the modified lookup table is used to perform automatic focusing again. Therefore, the projection apparatus and the auto-focus method can effectively solve the problem of out-of-focus of the projected image caused by the traditional auto-focus due to machine error.

BRIEF DESCRIPTION OF THE DRAWINGS

FIG. 3 is a flowchart of an auto-focus method according to a first embodiment of the present invention.

FIG. 4 is a flow chart of the steps of making the controller adjust the focal length of the projection lens according to the projection distance sensed by the look-up table and the distance sensor in FIG. 3 to perform automatic focusing.

FIG. 5 is a flow chart of steps in which the controller updates the minimum value and the maximum value of one of the focal-length segments after confirming that the focal adjustment phase is completed in FIG. 3.

DESCRIPTION OF THE EMBODIMENTS

Figure 1:
FIG. 1 is a schematic diagram of a projection apparatus according to a first embodiment of the present invention.

FIG. 1 is a schematic diagram of a projection apparatus according to a first embodiment of the present invention. Referring to FIG. 1, an embodiment of the present invention provides a projection apparatus 10 including a projection module 100, a projection lens 200, an actuator 300, a distance sensor 400 and a controller 500.

In the embodiment, the projection module 100 is adapted to project an image beam IB onto a projection surface PS to generate a projection image. Among them, the projection surface PS is, for example, a curtain or a wall, but the present invention is not limited thereto. The projection module 100 may include, for example, a light source module and a light valve. The light source module is used for providing illumination light beams. The light valve is disposed on a transmission path of the illumination light beam, and is used for converting the illuminating light beam into the image beam IB. The light valve is, for example, Liquid Crystal on Silicon panel (LCoS panel), Digital Micro-mirror Device (DMD) and other reflective light modulators or Transparent Liquid Crystal Panel, Electro-Optical Modulator, Magneto-Optic modulator, Acousto-Optic Modulator (AOM), and other transmissive optical modulators.

In the embodiment, the projection lens 200 is disposed on a transmission path of the image beam IB. The projection lens 200 includes, for example, a combination of one or more optical lenses with diopters.

In the embodiment, the actuator 300 is connected with the projection lens 200, and is used to adjust the focal length of the projection lens 200. The actuator 300 includes driving devices such as stepping motors. The actuator 300 is connected with the projection lens 200, and the actuator 300 is controlled by the controller 500 to move the projection lens 200 to adjust the imaging focal length of the projection lens 200.

In the embodiment, the distance sensor 400 is used to sense the projection distance PD between the projection apparatus 10 and the projection surface PS. The distance sensor 400 can be a time-of-flight distance sensor, an ultrasonic sensor, an infrared distance sensor or other distance sensors.

In the embodiment, the controller 500 includes, for example, Microcontroller Unit (MCU), central processing unit (CPU), microprocessor, digital signal processor (DSP), programmable controller, programmable logic device (PLD) or other similar devices or a combination of these devices, but the present invention is not limited thereto. Besides, in an embodiment, each function of the controller 500 can be implemented as a plurality of program codes. These program codes will be stored in a memory and executed by the controller 500. Or, in an embodiment, each function of the controller 500 may be implemented as one or more circuits. The present invention does not limit the implementation of the functions of the controller 500 by means of software or hardware.

In the embodiment, the controller 500 is electrically connected to the projection module 100, the actuator 300 and the distance sensor 400, and is configured to adjust the focal length of the projection lens 200 according to a look-up table and the projection distance sensed by the distance sensor 400, so as to perform automatic focusing. Wherein, the look-up table can be stored in the memory of the controller 500, but the present invention is not limited thereto. The look-up table includes a plurality of focal-length segments. The focal length falls within one of the focal-length segments. After confirming an end of a focus adjustment phase, the controller 500 updates a minimum value and a maximum value of the one of the focal-length segments.

distance PD falls within the focal length segment whose projection distance is 0.6 to 0.5 meters. Wherein, in this focal length segment, the maximum value of the focal length is 66 mm, and the minimum value of the focal length is 55 mm. If the focal length corresponding to the projection distance PD is calculated by interpolation method, the calculated focal length is 60.5 mm. However, considering that the minimum unit of the focal length is 1 mm, the rounding function can be used to obtain the adjusted focal length value, for example, 60 mm. Therefore, the controller 500 can adjust the focal length of the projection lens 200 to 60 mm, so as to perform automatic focusing.

However, when the focal length is at 60 mm and the projection image is still unclear, the system can enter the focus adjustment phase (for example, manual focusing). After the focus adjustment phase is over, the system can obtain the updated focal length, for example, 63 mm. Then, the controller 500 updates the minimum and maximum values of the focal length segment, for example, the updated minimum value is 58 mm, and the updated maximum value is 69 mm. Therefore, the controller 500 performs automatic focusing according to the updated minimum and maximum values.

In the embodiment, the focal length of the projection lens 200 is greater than the minimum value of the one of the focal length segments and less than or equal to the maximum value of the one of the focal length segments, and the adjusted focal length is greater than the updated minimum value and less than or equal to the updated maximum value. In another embodiment, the focal length of the projection lens 200 is greater than or equal to the minimum value of the one of the focal length segments and less than the maximum value of the one of the focal length segments, and the adjusted focal length is greater than or equal to the updated minimum value and less than the updated maximum value.

In the embodiment, the projection distance PD is greater than a minimum distance and less than or equal to a maximum distance, wherein the minimum distance and the maximum distance are respectively the projection distance PD corresponding to the minimum value of the one of the focal length segments and the maximum value of the one of the focal length segments. The controller 500 calculates the focal length corresponding to the projection distance PD according to the interpolation method and the rounding function. In another embodiment, the projection distance PD is greater than or equal to the minimum distance and less than the maximum distance.

In the embodiment, the maximum value and the minimum value of each focal length segments are determined by a linear equation, a polynomial equation, or a special equation of a focal length relative to the projection distance PD.

TABLE 1

| Projection Distance (m) | Infinite Distance | | 32 | 16 | 8 | 4 | 3 | 2 | 1.5 | 1 |
|---|---|---|---|---|---|---|---|---|---|---|
| Focal Length (mm) | 0 | | 1 | 2 | 4 | 9 | 11 | 17 | 23 | 34 |
| Projection Distance (m) | 0.8 | 0.6 | 0.5 | 0.4 | 0.3 | 0.25 | 0.2 | 0.17 | 0.15 | |
| Focal Length (mm) | 42 | 55 | 66 | 81 | 105 | 124 | 151 | 174 | 194 | |

Table 1 is an example of a look-up table. In Table 1, the projection distance PD is divided into 17 focal length segments from infinity to 0.15 meters. For example, when the projection distance PD is 0.55 meters, the projection In the embodiment, the rounding function is a ceiling function, a floor function, or rounding.

In the embodiment, the updated maximum value and the updated minimum value of the one of the focal length segments are m+D and M+D respectively, wherein m is the minimum value, M is the maximum value, and D is the difference between the adjusted focal length and the focal length.

In the embodiment, the controller 500 receives a focus adjustment command AC from the user or an external remote-control device by the controller, to confirm that the adjusted focal length is not generated through automatic focusing. For example, the controller 500 controls the projection module 10, so that the projection image is a User Interface (UI) or On Screen Display (OSD) picture suitable for focus adjustment, so as to generate the focus adjustment command AC.

Based on above, in an embodiment of the present invention, the projection apparatus 10 makes the distance sensor 400 sense the projection distance PD between the projection apparatus 10 and the projection surface PS, and makes the controller 500 adjust the focal length of the projection lens 200 according to the look-up table and the projection distance PD sensed by the distance sensor 400 for automatic focusing. Wherein, the look-up table includes a plurality of focal-length segments, and the focal length falls within one of the focal-length segments. Moreover, after confirming an end of a focus adjustment phase, the controller 500 updates a minimum and a maximum value of the focal-length segment. That is to say, dynamically modify the look-up table through the result of the focus adjustment phase, and then use the modified look-up table to perform automatic focusing. Therefore, the projection apparatus 10 can effectively solve the problem of out-of-focus of the projected image caused by the traditional auto-focus due to machine error.

Figure 2:
FIG. 2 is a schematic diagram of a projection apparatus according to a second embodiment of the present invention.

FIG. 2 is a schematic diagram of a projection apparatus according to a second embodiment of the present invention. Referring to FIG. 2, the projection apparatus 10' is roughly similar to the projection apparatus 10 in FIG. 1, the main differences are: the projection apparatus 10' further includes a displacement sensor 600. The displacement sensor 600 is electrically connected with the controller 500, is used to generate a displacement signal DS when the projection apparatus 10' is shaken. After the displacement sensor 600 generates the displacement signal DS and the displacement sensor 600 stops generating the displacement signal DS, the controller 500 performs automatic focusing again. Wherein, the displacement sensor 600 can include gravity sensor (G sensor), image sensor, gyro sensor or distance sensor. The displacement signal DS can include vibration signal, angle change or distance change. For example, use the G sensor is used to sense the acceleration of the projection apparatus 10' by external force or use the image sensor to sense the change of the environment image, so that the displacement sensor 600 can generate the displacement signal DS of vibration. For example, the gyro sensor is used to sense the angle change of the projection apparatus 10' by external force, so that the displacement sensor 600 generates the displacement signal DS of the angle change. For example, the distance sensor is used to sense the distance change between the projection apparatus 10' and an object (such as the projection surface PS), so that the displacement sensor 600 generates the displacement signal DS of the distance change.

In the embodiment, after the projection distance PD is updated, the controller 500 performs automatic focusing again. That is to say, when the displacement sensor 600 generates the displacement signal DS, the projection apparatus 10' stops automatic focusing. And after the value of the projection distance PD stabilizes or when the displacement sensor 600 stops generating the displacement signal DS, the automatic focusing is performed again. Wherein, the above-mentioned change of the projection distance PD is caused by, for example, the projection apparatus 10' being moved, or the projection surface PS being moved. In an embodiment, the controller 500 controls the distance sensor 400 to sense the projection distance PD every fixed time to confirm whether the projection distance PD is changed.

Based on above, when the projection apparatus is shaken and the automatic focusing is still in progress, the projection image may show a discontinuous viewing effect. In an embodiment of the present invention, the projection apparatus 10' utilizes the displacement signal DS generated by the displacement sensor 600 to determine whether the projection distance PD has changed, and performs automatic focusing after stopping generating the displacement signal DS. Therefore, the projection apparatus 10' can produce better viewing effect. The remaining advantages of the projection apparatus 10' are similar to those of the projection apparatus 10, and will not be repeated here.

FIG. 3 is a flowchart of an auto-focus method according to a first embodiment of the present invention. Referring to FIG. 3, an embodiment of the present invention provides an auto-focus method, which includes the following steps. Step S100, the projection apparatus 10 enters an auto-focus mode. Step S110, an image beam IB is generated by the projection apparatus 10, and the image beam IB is projected to a projection surface PS through the projection lens 200 to generate a projection image. Step S120, the distance sensor 400 senses a projection distance PD between the projection apparatus 10 and the projection surface PS. Step S130, the controller 500 adjusts the focal length of the projection lens 200 according to a look-up table and a projection distance PD sensed by the distance sensor 400, so as to perform automatic focusing. Step S140, after confirming an end of a focus adjustment phase, the controller 500 updates a minimum value and a maximum value of the one of the focal-length segments.

FIG. 4 is a flow chart of the steps of making the controller adjust the focal length of the projection lens according to the projection distance sensed by the look-up table and the distance sensor in FIG. 3 to perform automatic focusing. Referring to FIG. 3 and FIG. 4, step S130 includes the following steps. Step S132, the controller 500 calculates the focal length corresponding to the projection distance PD according to an interpolation method and a rounding function.

FIG. 5 is a flow chart of steps in which the controller updates the minimum value and the maximum value of one of the focal-length segments after confirming that the focal adjustment phase is completed in FIG. 3. Referring to FIG. 3 and FIG. 5, step S140 includes the following steps. Step S142, the controller 500 receives a focus adjustment command AC from the user or an external remote-control device, to confirm that the adjusted focal length is not generated through automatic focusing.

Figure 6:
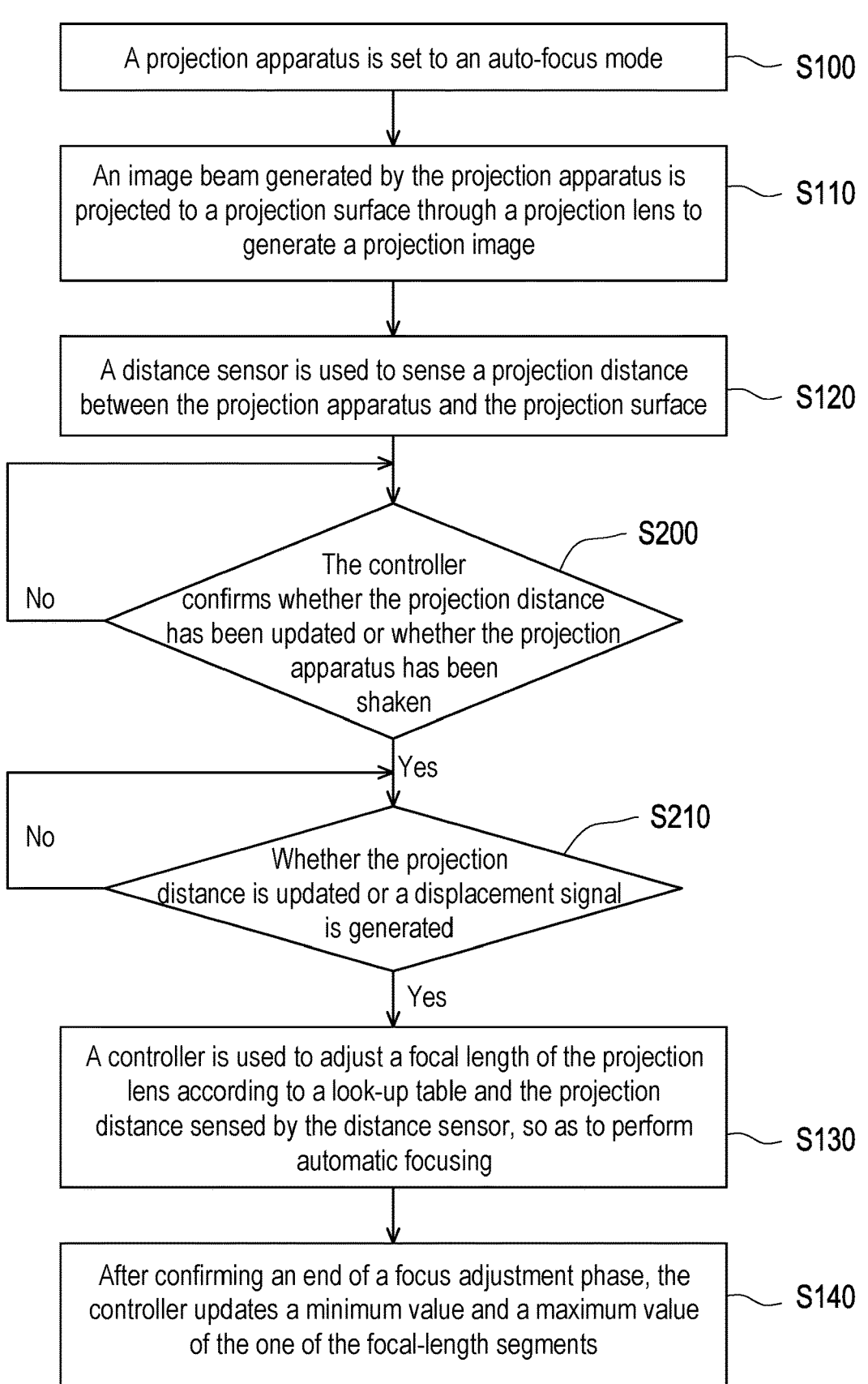
FIG. 6 is a flowchart of an auto-focus method according to a second embodiment of the present invention.

FIG. 6 is a flowchart of an auto-focus method according to a second embodiment of the present invention. Referring to FIG. 6, the auto-focus method of the second embodiment of the present invention is similar to the auto-focus method of the first embodiment of FIG. 3, and its main differences are as follows. In the embodiment, the auto-focus method further includes step S200: the controller 500 confirms whether the projection distance PD has been updated or whether the projection apparatus has been shaken. If yes, proceed to step S210: after the projection distance PD is updated or a displacement signal DS is generated, the controller 500 performs automatic focusing again.

In summary, in an embodiment of the present invention, the projection apparatus and the auto-focus method make the distance sensor to sense a projection distance between the projection apparatus and the projection surface, and makes the controller to adjust the focal length of the projection lens according to the look-up table and the projection distance sensed by the distance sensor, so as to perform automatic focusing. Wherein, the look-up table includes a plurality of focal-length segments, and the focal length falls within one of the focal-length segments. Moreover, after confirming an end of a focus adjustment phase, the controller updates a minimum value and a maximum value of the focal-length segment. That is to say, the look-up table is dynamically modified through the result of the focus adjustment phase, and then the modified look-up table is used to perform automatic focusing. Therefore, the projection apparatus and the auto-focus method can effectively solve the problem of out-of-focus of the projected image caused by the traditional auto-focus due to machine error.

What is claimed is:

1. A projection apparatus, comprising:
a projection module, adapted to project an image beam onto a projection surface to generate a projection image;
a projection lens, disposed on a transmission path of the image beam;
an actuator, connected to the projection lens and configured to adjust a focal length of the projection lens;
a distance sensor, configured to sense a projection distance between the projection apparatus and the projection surface; and
a controller, electrically connected to the projection module, the actuator and the distance sensor, and is configured to adjust the focal length of the projection lens according to a look-up table and the projection distance sensed by the distance sensor, so as to perform automatic focusing,
wherein the look-up table includes a plurality of focal-length segments, and the focal length falls within one of the focal-length segments; and
wherein after confirming an end of a focus adjustment phase, the controller updates a minimum value and a maximum value of the one of the focal-length segments.

2. The projection apparatus according to claim 1, wherein the focal length is greater than the minimum value and less than or equal to the maximum value;
wherein an adjusted focal length is determined during the focus adjustment phase, and the adjusted focal length is greater than the updated minimum value and less than or equal to the updated maximum value.

3. The projection apparatus according to claim 2, wherein the projection distance is greater than a minimum distance and less than or equal to a maximum distance, the minimum distance and the maximum distance are projection distances corresponding to the minimum value and the maximum value respectively;
wherein the controller calculates the focal length corresponding to the projection distance according to an interpolation method and a rounding function.

4. The projection apparatus according to claim 3, wherein the maximum value and the minimum value are determined by a linear equation, a polynomial equation, or a special equation of a focal length relative to the projection distance.

5. The projection apparatus according to claim 3, wherein the rounding function is a ceiling function, a floor function, or rounding.

6. The projection apparatus according to claim 1, wherein the focal length is greater than or equal to the minimum value and less than the maximum value;
wherein an adjusted focal length is determined during the focus adjustment phase, and the adjusted focal length is greater than or equal to the updated minimum value and less than the updated maximum value.

7. The projection apparatus according to claim 6, wherein the projection distance is greater than or equal to a minimum distance and less than a maximum distance, the minimum distance and the maximum distance are projection distances corresponding to the minimum value and the maximum value respectively;
wherein the controller calculates the focal length corresponding to the projection distance according to an interpolation method and a rounding function.

8. The projection apparatus according to claim 7, wherein the maximum value and the minimum value are determined by a linear equation, a polynomial equation, or a special equation of a focal length relative to the projection distance.

9. The projection apparatus according to claim 7, wherein the rounding function is a ceiling function, a floor function, or rounding.

10. The projection apparatus according to claim 1, wherein the updated minimum value and the updated maximum value are m+D and M+D respectively, wherein m is the minimum value, M is the maximum value, and D is the difference between an adjusted focal length determined during the focus adjustment phase and the focal length.

11. The projection apparatus according to claim 1, wherein after the projection distance is updated, the controller performs automatic focusing again.

12. The projection apparatus according to claim 1, further comprises:
a displacement sensor, electrically connected with the controller and configured to generate a displacement signal when the projection apparatus is shaken,
wherein after the displacement sensor generates the displacement signal and the displacement sensor stops generating the displacement signal, the controller performs automatic focusing again.

13. The projection apparatus according to claim 1, wherein the controller receives a focus adjustment command from the user or an external remote-control device, to confirm that an adjusted focal length is not generated through automatic focusing.

14. The projection apparatus according to claim 13, wherein the controller controls the projection module to make the projection image suitable for a focus adjustment user interface or a control screen displayed on a screen, so as to generate the focus adjustment command.

15. An auto-focus method, comprising:
setting a projection apparatus to an auto-focus mode;
projecting an image beam generated by the projection apparatus to a projection surface through a projection lens to generate a projection image;
sensing a projection distance between the projection apparatus and the projection surface by a distance sensor;
adjusting a focal length of the projection lens by a controller according to a look-up table and the projection distance sensed by the distance sensor, so as to perform automatic focusing, wherein the look-up table includes a plurality of focal-length segments, and the focal length falls within one of the focal-length segments; and after confirming an end of a focus adjustment phase, the controller updates a minimum value and a maximum value of the one of the focal-length segments.

16. The auto-focus method according to claim 15, wherein the step of adjusting the focal length of the projection lens according to the look-up table and the projection distance sensed by the distance sensor to perform automatic focusing comprises:

calculating the focal length corresponding to the projection distance by the controller according to an interpolation method and a rounding function.

17. The auto-focus method according to claim 15, further comprises:

confirming whether the projection distance has been updated or whether the projection apparatus has been shaken by the controller, if yes, then:

after the projection distance is updated or a displacement signal is generated, the controller performs automatic focusing again.

18. The auto-focus method according to claim 15, wherein the step of after confirming an end of a focus adjustment phase, the controller updates a minimum value and a maximum value of the one of the focal-length segments comprises:

receiving a focus adjustment command from the user or an external remote-control device by the controller, to confirm that an adjusted focal length is not generated through automatic focusing.

\* \* \* \* \*